US00RE34456E

United States Patent [19]

Harmsen et al.

[11] E Patent Number: Re. 34,456

[45] Reissued Date of Patent: Nov. 23, 1993

[54] MINIATURE AXIAL FAN

[75] Inventors: Siegfried Harmsen, Georgen; Gunter Wrobel, Villingen, both of Fed. Rep. of Germany

[73] Assignee: Papst Motoren, Fed. Rep. of Germany

[21] Appl. No.: 659,662

[22] Filed: Feb. 21, 1991

Related U.S. Patent Documents

Reissue of:

[64] Patent No.: 4,806,081
Issued: Feb. 21, 1989
Appl. No.: 221,947
Filed: Jul. 6, 1988

U.S. Applications:

[63] Continuation of Ser. No. 928,476, Nov. 10, 1986, abandoned.

[30] Foreign Application Priority Data

Oct. 8, 1985 [DE] Fed. Rep. of Germany ..... 3539623

[51] Int. Cl.[5] ..... F04D 25/00

[52] U.S. Cl. ..... 417/354; 417/423.14

[58] Field of Search ..... 417/354, 353, 352, 423.15, 417/423.14, 424.1; 415/181, 119, 200, 207, 220

[56] References Cited

U.S. PATENT DOCUMENTS

| | | | |
|---|---|---|---|
| 2,397,170 | 3/1946 | Jenkins | 417/423.14 |
| 2,427,032 | 9/1947 | Troller et al. | 417/423.14 |
| 2,926,838 | 3/1960 | Van Rijn | 417/354 |
| 3,362,627 | 1/1968 | Papet | 417/354 |
| 3,819,294 | 6/1974 | Honnold et al. | 416/93 |
| 4,063,852 | 12/1977 | O'Connor | 416/223 R |
| 4,120,609 | 10/1978 | Chou et al. | 416/223 R |
| 4,337,405 | 6/1982 | Hishida | 310/43 |
| 4,373,861 | 2/1983 | Papst et al. | 417/354 |
| 4,482,302 | 11/1984 | Grignon | 415/220 |
| 4,554,473 | 11/1985 | Müller | 310/67 R |
| 4,639,193 | 1/1987 | Reichert et al. | 416/241 A |

FOREIGN PATENT DOCUMENTS

| | | | |
|---|---|---|---|
| 100078 | 7/1983 | European Pat. Off. . | |
| 2252415 | 5/1973 | Fed. Rep. of Germany | 417/353 |
| 3118289 | 3/1982 | Fed. Rep. of Germany . | |
| 1110068 | 2/1956 | France | 416/223 R |
| 348501 | 10/1960 | Switzerland | 416/223 A |
| 519032 | 3/1940 | United Kingdom | 416/223 R |
| 1154812 | 6/1969 | United Kingdom . | |
| 1439513 | 6/1976 | United Kingdom . | |
| 1438313 | 9/1976 | United Kingdom . | |
| 2014658 | 8/1979 | United Kingdom . | |
| 2059859 | 4/1981 | United Kingdom . | |
| 2080046 | 1/1982 | United Kingdom . | |
| 2133082 | 7/1984 | United Kingdom | 417/354 |

*Primary Examiner*—Richard A. Bertsch
*Assistant Examiner*—Charles Freay
*Attorney, Agent, or Firm*—Barnes & Thornburg

[57] ABSTRACT

The invention relates to a miniature axial fan particularly of an axially compact construction, having a central motor driving a rotor disk with a housing surrounding the rotor disk in which an interior housing wall on the inflow side is cylindrical and extends past the axial center of the housing and then this cylinder wall expands outwardly to the outlet side of the housing to produce an enlargement of the flow cross-section. The housing has webs extending inwardly from the outlet side of the housing that carry the central driving motor with the rotor disk. A number of blades are mounted on the rotor disk which numbers differs from the number of webs.

21 Claims, 3 Drawing Sheets

MINIATURE AXIAL FAN

Matter enclosed in heavy brackets [ ] appears in the original patent but forms no part of this reissue specification; matter printed in italics indicates the additions made by reissue.

This is a continuation of application Ser. No. 928,476, filed Nov. 10, 1986, now abandoned.

BACKGROUND AND SUMMARY OF THE INVENTION

The invention relates to a miniature axial fan particularly of an axially compact construction, having a central motor driving a rotor disk with a housing surrounding the rotor disk in which an interior housing wall on the inflow side is cylindrical and extends past the axial center of the housing and then this cylinder wall expands outwardly to the outlet side of the housing to produce an enlargement of the flow cross-section. The housing has webs extending inwardly from the outlet side of the housing that carry the central driving motor with the rotor disk. A number of blades are mounted on the rotor disk which numbers differs from the number of webs.

In the case of axial fans of such a small size, there is, in addition to the often required compactness, the requirement of a low noise level and of an air output that is sufficient for its use. Because of the given small outside dimensions that is not easy to achieve. In the range of these dimensions and below, there is therefore a struggle involving millimeters. If one parameter, one dimension is changed by a few millimeters in favor of one characteristic, this has a considerable effect on other characteristics and thus on the overall characteristics.

On the basis of the European Patent Application 0100078, an axial fan is known that is suitable for a rotor disk diameter of below 100 mm.

The invention is therefore based on the objective of developing a very small, relatively compact axial fan having a rotor disk driven by a concentric coaxial driving motor in such a way that, in the case of the small size offered here, it has a relatively good air output and a low noise level.

The invention is achieved by the means of a miniature axial fan, particularly of an axially compact construction, having a central motor driving a rotor disk with a housing surrounding the rotor disk in which an interior housing wall on the inflow side is cylindrical and extends past the axial center of the housing and then this cylinder wall expands outwardly to the outlet side of the housing to produce an enlargement of the flow cross-section. The housing has webs extending inwardly from the outlet side of the housing that carry the central driving motor with the rotor disk. A number of blades are mounted on the rotor disk which numbers differs from the number of webs. A rotor disk has a diameter of no more than 60 mm. The blades are designed in such a way that on the output side they have a large adjusting angle of 70° to 90° due, to the fact that when viewed in a top view, that is radial with respect to the axis of rotation onto the blade, the bend of the blade from the direction of the inlet side is at first slight and this bend then changes into a bend that becomes more extensive up to the blade edge on the outlet side.

These and other objects, features, and advantages of the present invention will become more apparent from the following description when taken in connection with the accompanying drawings which show, for the purpose of illustration only, plural embodiments in accordance with the present invention, and wherein:

BRIEF DESCRIPTION OF THE DRAWINGS

FIGS. 1 and 2 are both shown in twice their real size, thus at a scale of 2 : 1, and show a fan housing into which a rotor disk with a coaxial driving motor can be inserted.

DETAILED DESCRIPTION OF THE DRAWINGS

Figure 1:
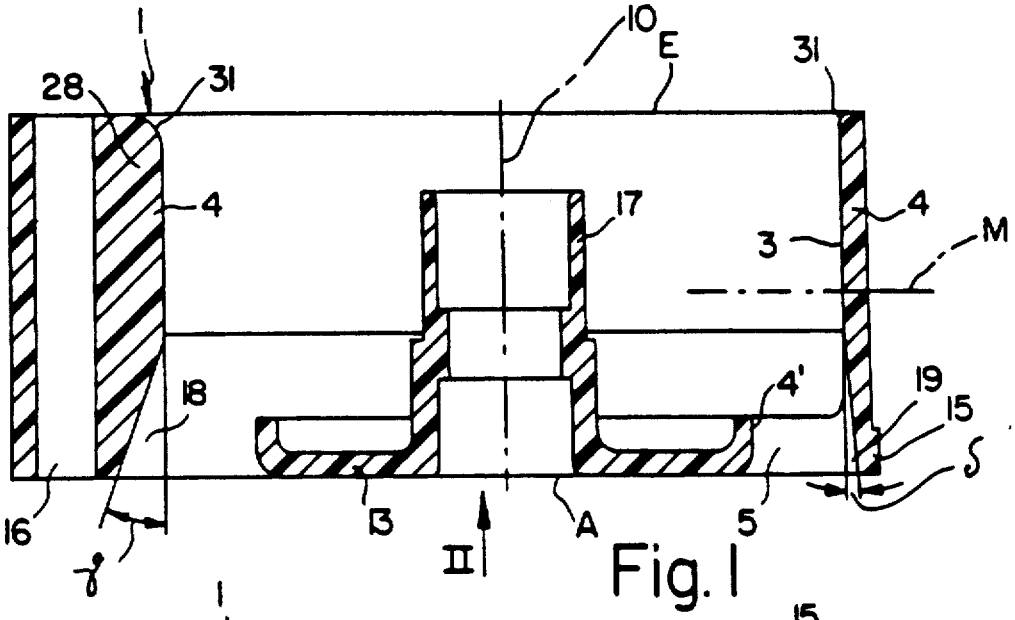
FIG. 1 is a sectional view along the Cutting Line I/I of FIG. 2.

Referring now to the drawings wherein like reference numerals are used to designate like parts and more particularly to FIG. 1 shows a bent longitudinal section through the housing 1 of a miniature fan according to the invention. Concentrically to the rotational axis 10 is a bearing tube 17 having a plurality of stepped ridge portions acting as stops for bearings and for positioning of the stator body.

The bearing tube 17 is unitarily formed with the flange 13 which has an outer edge 4' to which four radially extending webs 5 are connected at 90° intervals. The webs 5 extend into the center area of a square sideof the fan housing tube 4 at an externally shaped square flange plate 15. The housing tube 4 extends axially along rotational axis 10 with its cylindrical interior wall surface 3 extending from the inlet plane E to the outlet plane at flange 13. Radially outside the housing tube 4 are fastening columns 14 at corners of the square flange plate 15. The columns also extend from the outlet plane A axially to the inlet plane E. All these parts bearing tube 17, flange 13, webs 5, tube 4, housing 1, column 14, and flange plate 15 are developed as a one-piece plastic injection molded part. The fastening columns 14 extend the full axial length of the fan and have a compact construction to provide an excellent stiffness for the fastening of the minifan. In addition, by means of this unitary design for forming the inside and outside flow duct, with only one joint face, the housing 1 can be created in an inexpensive mold. The fastening bores 16 of the columns 14 are concentric with axis 10.

The enlarging spaces 18, 19 with the enlarging angle $\gamma$, $\delta$ at the outlet plane A that extend from the cylindrical part of the interior wall surface 3 to the outlet plane A, ensure because of their very small angle $\delta$ that the housing can be easily removed from the mold while additionally providing an increase of the cross-section area of the flow duct at the outlet plane A, even though the increase is minimal. The cylindrical part of the interior wall surface 3, for reasons of manufacturing technology in the case of the injection-molded piece, must have an incline to aid for in the lifting-out of housing from the mold. I.e., this cylindrical part is only essentially cylindrical (compare angle $\delta$). The enlarging spaces 18 into the four corners of the square end plate 15 with the significantly larger enlarging angle $\gamma$ are known per se from the German Patent Text 17 28 338. The enlarging spaces 18 also extend conically (or in steps) to the outlet plane A from the direction of the cylindrical part 3 of the flow duct.

Figure 2:
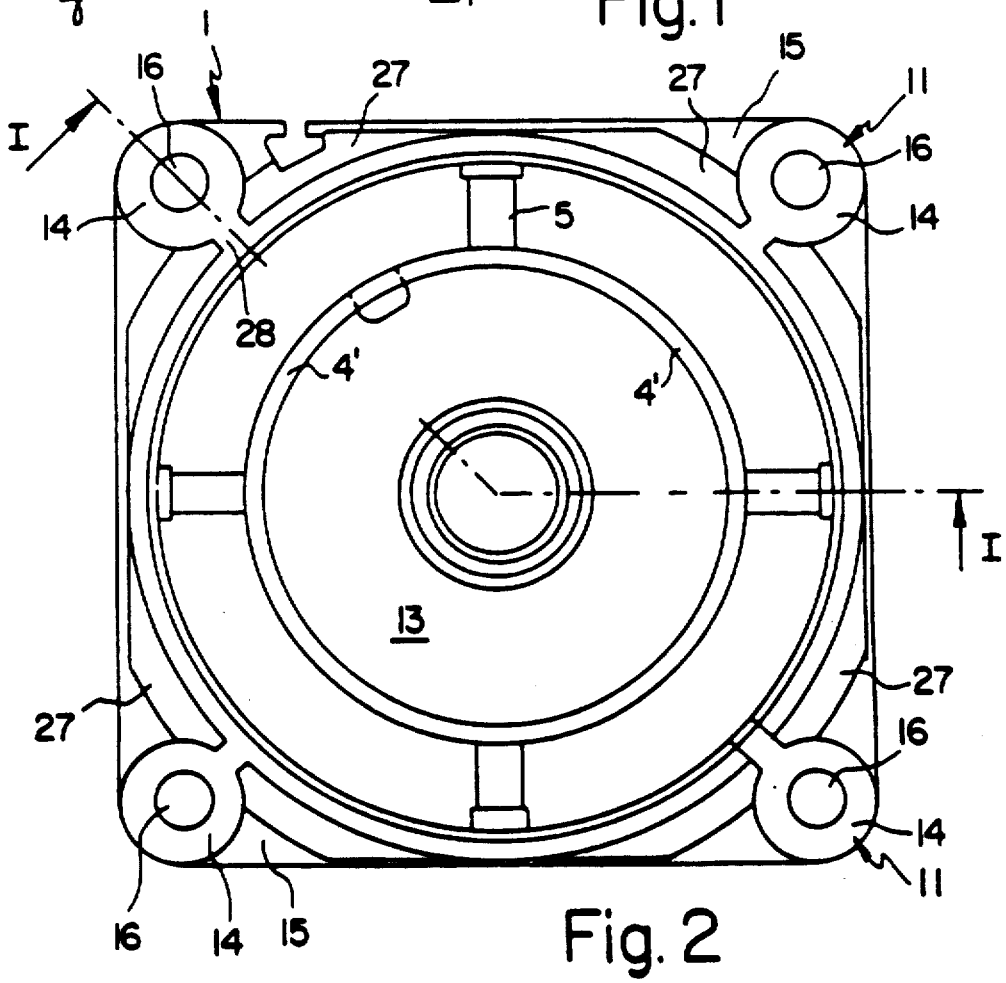
FIG. 2 is a top view in the direction of the Arrow II of FIG. 1.

The diagonal wall of the enlarging spaces 18 is shown from the outside in FIG. 2 (compare number 27). Between the fastening columns 14 and the housing tube 1, continuous bridges 28 are provided that provide stability to the columns 14 and to the housing tube 1. On the side of the inlet, the interior wall surface 3 has a rounded off area which in practice, in its real size, has a bending radius of about 4 to 5 mm.

The real size of FIGS. 1 and 2 is therefore that of a cuboid of 50×50×25 mm. In the present construction that is shown in FIG. 1 and 2, this provides for: a combination of an optimal flow duct, a relatively high stability of the housing structure, an economical manufactured product, with dimensions of a small size. To obtain this product, measurements and proportions have significance. The round columns 14 that are developed with round holes for the continuous fastening bolts 16 and the thin bridges 28 that continue over the whole axial length of the housing radially to the thin housing ring 1, make possible for an optimal and simple molding process.

Figure 4:
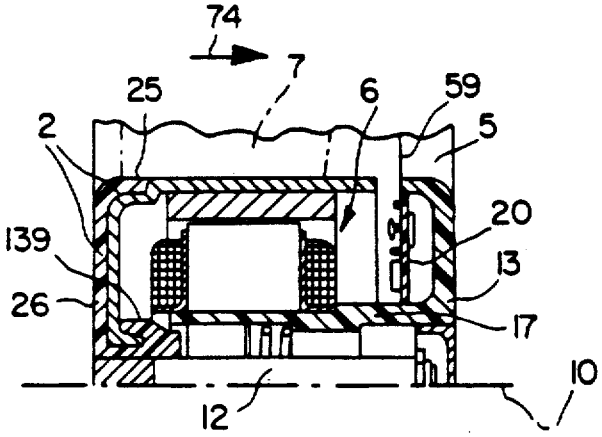
FIGS. 3, 3a, 4, 5 show variants of such driving motors according to the invention also having a rotor disk in twice the real size, in which case the outer rotors of the driving motor and the rotor disk hub are developed differently.
Figure 3A:
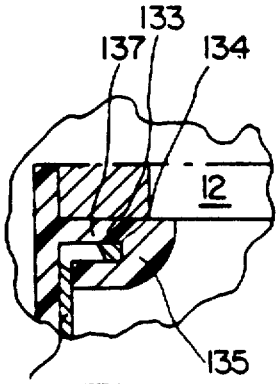
Figure 3:
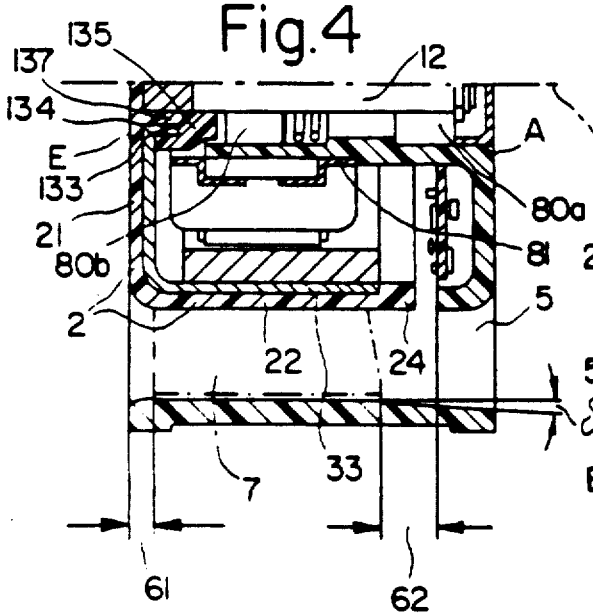
Figure 5:
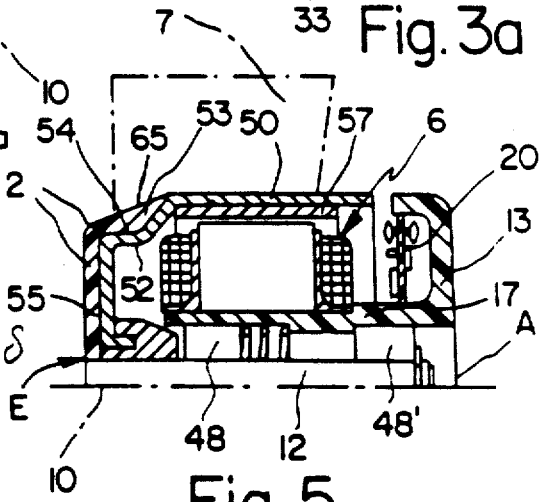

In FIGS. 3, 4, 5, the bearing tube 17 and the flange 13 are constructed as shown in FIG. 1. The armature stampings of the stator are fitted onto the inlet end facing step of the bearing tube 17, and strike against this step with insulating end plates. In the interior of the bearing tube 17, a pair of ball bearings 80 and 80b are braced axially by a spring 81 for supporting a shaft 12 that in a torsionally fixed way is connected with the outer rotor housing 2, or the rotor disk hub 33. FIGS. 3 to 5 are constructed differently only with respect to the configuration of the outer rotor cap 2 and the rotor disk hub 33 (FIGS. 3,4) and 50 (FIG. 5). In all three cases, identical blades 7 can be combined on a hub 22 (FIG. 3), hub 33 (FIG. 4), or on hub 50 (FIG. 5). Also the armature stampings are identical with the winding of a driving motor 6 as well as the electronic commutating system 20—located axially and internally in the flange shell 13.

In the case of axial fans of this small size, it is important, when using a relatively large driving motor 6, where there is a relative large ratio of the diameter the rotor disk hub 22, 23, or 50 or the driving motor diameter—to the outer diameter of the envelope of the blade ends at the interior walls 3, to make the radial dimension of the blade relatively large. In other words, it is desirable to construct the driving motor and hub so as to extend for a small portion of the inner diameter of the interior of flow wall 3. The pump air flow duct is defined as the area formed by the hub and the outer rotor interiorly and the flow wall 3 exteriorly. The object of FIGS. 3, 4, 5 is to provide conditions that are favorable to achieve a certain output requirement and a secure fastening of the rotor disk blades 7 at the plastic hub 22 and 50, as well as of the fan wheel on the outer rotor and to nevertheless make available a sufficient air output.

In FIG. 3, a plastic-bound magnet is used (or a ceramic magnet, but always still a magnet) of a relatively large thickness, over which a relatively thin bowl-shaped cap 33 of low retentivity is pulled. The rotor disk hub 21, with its cylindrical exterior part 22, completely reaches around the cap 33, whereby good anchoring is achieved by the fact that at the open end 24 of the bowl, the plastic is thickened inward to partially enclose the cap 30, i.e., by means of the plastic hub 21 with its exterior part and thickened end. A form-locking holding of the outer rotor is achieved by means of the fact that the injection molding takes place around the bowl-shaped cap 33 , whereby the exterior part 22 with the radial wall 21 as a whole is combined into bowl-shaped hub and with the blades 7 into a rotor disk 2 that in a known manner is developed in one part as an injection-molded part.

FIG. 3 shows a further independently important economically advantageous method and structure to fix the rotor 2 on the shaft 12 by mere plastic injection molding. The soft-iron cap 33 with its inner axially bent collarlike rim 133 there is completely embedded in the plastic means. The internal surface 134 of said collar like rim 133 is separated by a distance of about 0.5 to about 2 mm from the shaft 12, and preferably the distance is 0.6 mm. This distance or gap 137 is filled with plastic and the collar like rim 133 is partly perforated, so that the plastic part 135 surrounds and penetrates the rim or collar like rim 133. The gap is as small as possible so that plastic material, when injected, penetrates the gap. Because of heat problems the gap should be no larger than 1 to 2 mm. Said cylindrical collar surrounding said shaft is fixed with the rotor in any well known way.

FIG. 4 shows a known, more costly method of locating the blades 7 about the shaft 12 where a separate additional metal piece 139 is located between the shaft and the collar is necessary.

The method of FIG. 3 is important, independently of the type of fan or structure of the rotor housing.

In FIG. 3, the internal rim of the rotor-holding reinforcement cap element 33 is punched and bent in one step with the whole caplike element 33.

FIG. 4 shows a cylindrical part 25 of a rotor disk hub 26 that only projects out over a relatively small part, about one fourth of the axial lengths of the outer rotor of the driving motor. The bowl-shaped cap element 33 of the outer rotor, that is of low retentivity, is reduced in its diameter in steps so that a cylindrical outer surface makes possible a press fit for the plastic hub 25, 26, in which case its outside diameter corresponds approximately to the outside diameter of the rotor bowl cap element. In this way, with otherwise identical engine dimensions, a slightly larger cross-section is obtained by the elimination of the cylindrical exterior wall 22 o: the plastic hub 21. Naturally, in the case of FIG. 4, the plastic hub with theradial front surface 26 and the cylindrical edge part 25 that is developed as a ring collar are injection-molded in one piece with the blades 7. In this case, this important expansion of the flow cross-section, i.e., reduction of the driving motor in its diameter including the rotor disk hub, takes place by such a reduced diameter.

Figure 6:
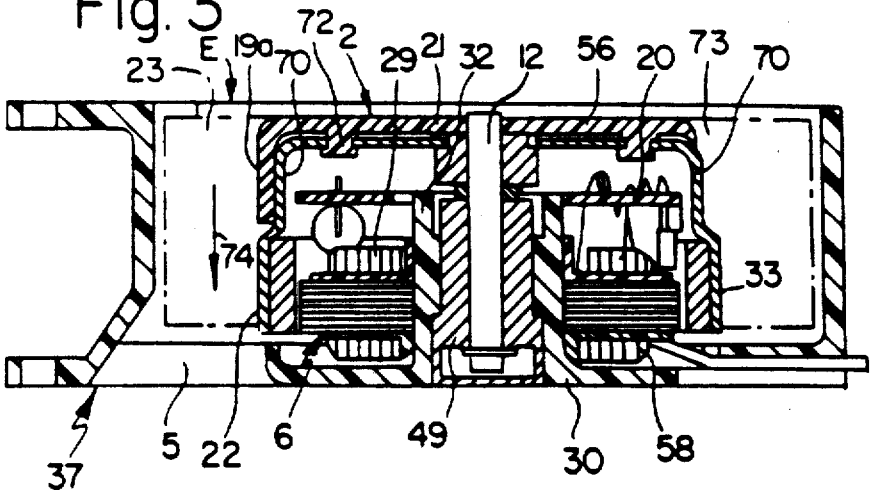
FIG. 6 is an embodiment with an additional or alternative fastening of the plastic rotor disk on the outer rotor can by means of heat-upsetting. In addition, an electronic commutating system is provided there on a ring-shaped support under the outer rotor cap.

Should the mounting of this rotor disk on the outer rotor not be good enough, it may, as shown in FIG. 6, be held in addition or as an alternative in the end of the rotor cap element 70 by means of journals 72 that are upset from the hub by heating. This would make it possible that the cylindrical end projection 25 can be eliminated. In that case, a cone-type tapering could be provided in the direction of the inlet plane E. The reason for this type of cone-type tapering of the rotor disk hub in the direction of the inlet plane E is to make possible an additional improvement of the flow behavior, particularly if, on the outside, the limiting housing wall were to extend at first cylindrically from the flow-in side, as in known on the basis of EP-0100 078-A1 (EU-456).

In principle, it can be stated that this hot upsetting of the rotor disk hub in the front side of the outer rotor cap, as shown in FIG. 6, is useful as an additional measure or as an alternative. Thus a glueing-together or riveting-together may also take place so that, in the area of the reduced diameter, as shown in FIG. 6, by means of a conical outer contour of the rotor disk hub, or one that tapers in the direction of the inlet plane E as a whole, clearance 73 is created. That is also shown on the right-hand side of FIG. 6 where it is shown clearly that the ring part was left out.

If the rotor disk is made of a fiber-glass-reinforced plastic, this type of construction can be afforded. The blades will nevertheless adhere with the required stiffness to the disk-shaped hub 56. If the rotor disk is a metallic punched bent part, it is advantageous to rivet tee disk-shaped hub together with the rotor of the driving motor.

FIG. 5 shows an additional variant, where a radially deeper tapering step 65 is obtained to provide, a further enlargement of the inlet flow cross-section area.

By means of a more extensive reduction of the outer diameter of the housing 50 to the cylindrical step 52, of a diameter of 50 to 80% of the housing 50 because of the relatively small ring part 53 of the hub, there is still a sufficient amount of cross-section left to achieve a perfect press fit not only on the outer surface 54 of the housing step 52, but in addition, because there is sufficient cross-section, the outer contour of the plastic hub 2 with its overlapping ring part 53 can be constructed in such a way that it has a conical surface 65 that tapers in the direction of the inflow plane E, which again is favorable with respect to the flow, somewhat similar to that shown above in connection with FIG. 6. If the surface 65 extends axially at least over ⅓ of the flow duct length, this tapering is quite effective. Particularly by means of the concept of FIG. 5, this minimal length can be achieved in a mass-produced product without any problems. In the case of this embodiment, less demands are made on the plastic that carries the one-piece rotor disk 2 with the blades 7. Also having the ring part 53 with the radial bottom wall 55 plastic, may possibly be less expensive. In the case of FIG. 5, a rare-earth alloy, such as samarium cobalt, is used for the rotor magnet 57. It is known that these types of magnets require a much smaller volume so that the permanent magnet in a tube form may also be much thinner its radial thickness which, again in the case of the same air gap (the same magnetic conditions are a prerequisite), results in a further reduction of the outside diameter of the can 50. Thus, the small outside diameter of the driving rotor (in the case of the samarium-cobalt permanent magnet solution used here) and the radially extensive reduction of the step 52 (i.e., in the case of a ratio of the diameter of the step 52 to the diameter of the cylindrical part 50 of the outer rotor housing of 0.5 to 0.8) results in an effective conical tapering of the engine rotor disk hub in the direction of the inlet plane E. Again, in the case of FIG. 5, the same rotor may be provided as in FIGS. 3 or 4 so that therefore the same air gap diameter applies. In the case of FIG. 5, the whole radius natural wall thickness of the rotor bundle with the parts 50 and 57 is about 1 to 2 mm, and in the case of FIG. 3, it is about 3 to 4 mm which signifies a reduction of diameter of about 4 mm which is very important in the case of this small size (hub diameter about 30 mm) because the flow cross-section is significantly improved by the enlargement and design. This concept of FIG. 5 is basically advantageous for miniature fans with a central motor, particularly with outside rotors, independently of the housing. It is also advantageous for miniature, so-called "motor rotor disks" (i.e. motors in which the rotor disk is placed on the motor). It is not only for use with rare-earth rotor magnets (with or without cobalt), but very effective when they are used. Weaker magnets signify a slightly larger "hub" diameter.

In FIG. 6, on the left-hand side, a slightly different variant of a fan according to the invention is provided, in which a reduction of the outside diameter of the motor hub is visible.

FIG. 6 shows an injection-molded plastic fan wheel 2 having a hub portion 19a which carries the evenly distributed blades 7 on its periphery. It is pressed over the hub part 70 of the outside rotor housing 22 that is reduced in its diameter and is fastened in any secure manner. The outside diameter of the plastic hub 21 corresponds largely to the outside diameter of the rotor housing 22 near its open end.

The advantage of the plastic fan wheel is the fact that it results in an altogether cost-effective axial fan. It is also understandable that the outside diameter of the hub 21 is still smaller than would be the case if this hub were to completely reach over the outside rotor of the driving brushless direct-current motor. Therefore, the rotor constructed according to FIG. 6 with the fan wheel that is placed on it, is advantageously used in very small axial fans. The reason is that here, in the range of a rotor disk diameter of 30 to 60 mm with a coaxial "hub" motor, a minimal reduction of the rotor disk hub diameter is quite advantageous for the flow behavior (air volume/time and noise).

Although it is shown in FIG. 6 that the central fastening part 32 is the bearing tube, it should be clear that for many usages the central fastening part could also consist of only the interior side of the iron core 58 of the stator. Thus, the stator iron could be used as a fastening either for the ball bearings 48, 48' as shown in FIG. 5 or for slide bearings 49 in the case of certain usages of the brushless direct-current motor. The printed circuit board 20, in this case, would be fastened by means of pins at the appropriate point of the stator.

A further improvement of the structure consists of equipping the motor of FIG. 6 with the fan housing 37, the central fastening part 32, the flange 30 as well as the webs 5 out of a single cast plastic part.

Thus, an interior motor structure is shown for a brushless direct-current motor having an electronic driving system and a revolutions/min. control circuit that, on the inside of the motor, is fastened on a master board in such a way that it is possible to obtain in steps, a smaller diameter at the closed end of the hub of the outside rotor than at the open end of the outside rotor. This diameter that becomes smaller in steps makes it possible to use this type of motor for axial fans having a larger cross-section on the air inlet side of the fan, particularly in the case of a fan with smaller dimensions, as well as for usages where it is important that larger amounts of air be supplied at a higher pressure.

Figure 7:
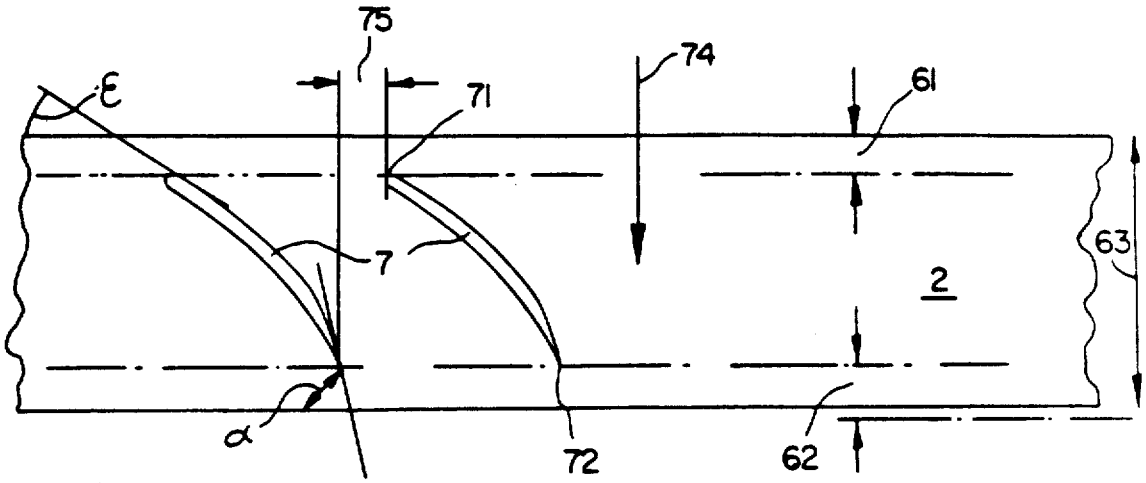
FIGS. 7 and 8 are details of the blade dimensioning for the rotor disk.

FIG. 7 is a partial view of the rotor disk hub 2, particularly according to FIG. 3. The blades 7 are arranged in a non-continuous distributed way at the circumference of the rotor disk hub 2. The clearance 75 (in this case about 3 mm) is varied in order to reduce noise. The flow direction is indicated by the arrow 74. The inlet edges 71 of the blades 7 are staggered by a first axial distance 61 from the inlet Plane E in the direction of an Arrow 74 that indicates the flow direction. In the embodiment according to FIG. 3, for example, this distance 61 is 3 mm. The inlet edge is developed with a radius of about 0.6 mm. In its demonstration last third, the blade 7 is tapered and ends at the outlet edge 72 with a thickness of 0.4 mm. The outlet edge 72 is set back by a second distance 62 in the opposite direction of the Arrow 74 from the inner web edge 59 of the webs 5, namely preferably 4 mm (compare FIG. 3). The axial dimension 63 of the rotor disk 2 (according to FIG. 3) is about 20 mm. The inlet angle $\epsilon$ at the inflow side that is formed by the tangent line at the radial exterior side of the blade edge 71 and the inflow plane E, is located in the range of 25° to 45°. The adjusting angle $\alpha$ at the outflow side, formed by the tangent line at the radial exterior side of the blade edge 72 and the outflow side A, is 70° to 90°, preferably 80°.

Figure 8:
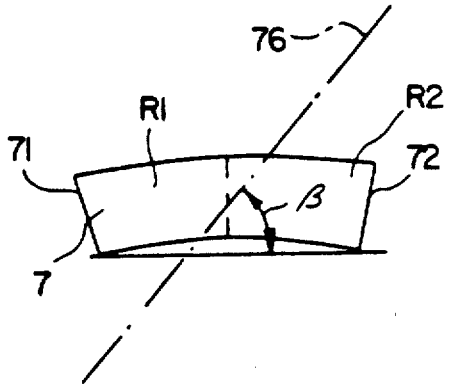

FIG. 8 shows the blade 7 as a part that is developed in a plane (and can, for example, be extruded or drawn out in this way). The blade 7 is developed on both sides of an axis 76 that has an angle of slope of about 45° with respect to the blade root, with different radiuses R 1 and R 2. The diameters of the two bending cylinders on both sides around the axis 76 are for 2 R 1 = 120 mm and 2 R 2 = 30 mm. In the case of a radial top view of the blade 7, the bend R 1 of the blade from the direction of the inlet edge 71 is at first slight and then changes into a more extensive bend R 2.

While we have shown and described only plural embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A miniature axial fan, particularly of an axially compact construction, comprising:

a central motor driving a rotor disk, said rotor disk having a diameter of not more than 60 mm;

a one-piece molded unitary housing surrounding said rotor disk and including an inlet flow side being cylindrical with an approximately constant diameter extending rearwardly to and over the axial center of said housing;

said housing also including more than one web means on the outlet side for holding said central motor and rotor disk and a square flange plate means at the housing outlet side for defining the configuration thereof;

said housing further including a fastening pillar means having a continuous fastening bore which extends from said inlet side to said outlet side of the housing, said fastening pillar extending from the square flange plate at the outlet side to the inlet side of the housing; and wherein said rotor disk has a number of fan blades thereon which number of blades differs from the number of web means.

2. A miniature axial fan according to claim 1, wherein said one-piece unitary housing has an expanding cross-sectional area at the outlet side by having said outlet flow side expand radially outwardly along a downstream flow direction.

3. A miniature axial fan according to claim 2, wherein the enlargement of the flow cross-section extends outwardly toward four contour corners of the square flange plate means defining the housing configuration in a way that increases in flow direction toward the outlet, with a continuous increase in cross-section.

4. A miniature axial fan according to claim 1, wherein the housing includes four web means arranged at centers of the square sides of the housing flange plate for holding the central driving motor.

5. A miniature axial fan according to claim 1, wherein the number of blades means cannot be divided evenly by the number of web means.

6. A miniature axial fan according to claim 1 wherein the motor has a rare earth metal magnet and said unitary housing also includes a rotor hub housing that is reduced in disk hub [its] diameter in steps for receiving the rotor in a press fit with an outside diameter of the rotor disk hub approximately the same as an outside diameter of the rotor hub housing.

7. A miniature fan according to claim 5 wherein there are seven blade means and four web means.

8. A miniature fan according to claim 7 wherein the inlet end of the blade means is set back 3 mm from the inlet side and the outlet edge of the blade means is set a distance of 4 mm from the web means.

9. A miniature fan according to claim 1, wherein the blade means have a large adjusting angle ($\alpha$) of 70° to 90° at the outlet end as seen in a top view that is radial with respect to the axis of rotation onto the blade, as the blade means first bends slightly from the direction at the blade means end at the inlet side and then this bend changes into a bend that becomes more extensive up to an edge of the blade means at the outlet side.

10. A miniature fan according to claim 1, wherein there is an exterior means that has a portion extending in a radial direction and located at the inlet to the housing and wherein the portion extending in a radial direction completely encloses a radially extending portion of the rotor disk.

11. A miniature fan according to claim 1, wherein there is an exterior means that has a portion extending from the inlet of the housing toward the outlet of the housing which portion of the exterior means completely encloses a portion of the rotor disk that lies adjacent to root portions of the blades.

12. A miniature fan according to claim 10, wherein the exterior means also has a portion extending from the inlet of the housing toward the outlet of the housing which latter portion of the exterior means completely encloses a portion of the rotor disk that lies adjacent to root portions of the blades.

13. A miniature axial fan according to claim 1, wherein the rotor disk has a diameter of 45 mm and the adjusting angle ($\alpha$) is about 80°.

14. A miniature axial fan according to claim 9, wherein the housing has an outer configuration of a square with a square side length of 50 mm, and wherein the slight bend corresponds to a bending radius (R 1) of about 60 mm, and the extensive bend (R 2) corresponds to a bending radius of about 15 mm.

15. A miniature axial fan according to any one of claim 13, 4, 5, 14 and 1 wherein, the inlet end of the blade means are set back from the inlet side by a few millimeters, and the outlet end of the blade means are set at an axial distance to the web means of a few millimeters.

16. A miniature axial fan according to any one of claims 13, 4, 5, 14 and 1 wherein the blade means do not overlap along the direction of the flow of the fan and wherein the inlet end of the blade means has a radius of about 4 mm.

17. A miniature axial fan according to any one of claims 13, 4, 5, 14 and 1 wherein the rotor disk hub has a diameter equal to at least half the rotor disk length.

18. A miniature axial fan according to any of claim 13, 4, 5, 14 and 1 wherein a rotor disk has a housing hub which, in the area tapers conically toward the inlet and wherein the rotor disk has a diameter which is below 50 mm.

*19. A miniature axial fan, particularly of an axially compact construction, comprising;*

*a central motor driving a rotor disk,*

*a one-piece molded unitary housing surrounding said rotor disk and including an inlet flow side extending rearwardly to an outlet flow side;*

*said housing also including more than one web means for holding said control motor and rotor disk;*

*a square flange plate means;*

*said housing further including a fastening pillar means having a continuous fastening bore which extends from said square flange plate and between said inlet flow side and said outlet flow side of the housing; and*

*wherein said rotor disk has a number of fan blades thereon, which number of blades differs from the number of web means.*

*20. The miniature axial fan of claim 19 wherein the housing has an inward circular configuration.*

*21. The miniature axial fan of claim 20 wherein the circular configuration encloses the rotor disk.*

* * * * *

UNITED STATES PATENT AND TRADEMARK OFFICE

CERTIFICATE OF CORRECTION

PATENT NO. : RE 34,456

DATED : November 23, 1993

INVENTOR(S) : Siegfried Harmsen et al.

It is certified that error appears in the above-indentified patent and that said Letters Patent is hereby corrected as shown below:

On the title page, item: [30] the priority date should read: November 8, 1985 [DE]

Signed and Sealed this

Twenty-fifth Day of March, 1997

*Attest:*

Bruce Lehman

BRUCE LEHMAN

*Attesting Officer*

*Commissioner of Patents and Trademarks*